(12) United States Patent
Chen

(10) Patent No.: US 11,372,236 B2
(45) Date of Patent: Jun. 28, 2022

(54) OPTICAL MODULE AND PROJECTION DEVICE

(71) Applicant: Coretronic Corporation, Hsin-Chu (TW)

(72) Inventor: Wei-Hao Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 276 days.

(21) Appl. No.: 16/892,261

(22) Filed: Jun. 3, 2020

(65) Prior Publication Data
US 2020/0386986 A1 Dec. 10, 2020

(30) Foreign Application Priority Data
Jun. 10, 2019 (CN) .......................... 201920859110.1

(51) Int. Cl.
| | |
|---|---|
| *G03B 21/14* | (2006.01) |
| *H04N 9/31* | (2006.01) |
| *G02B 26/08* | (2006.01) |
| *G02B 27/18* | (2006.01) |
| *G02B 7/02* | (2021.01) |

(52) U.S. Cl.
CPC .......... *G02B 26/0875* (2013.01); *G02B 7/02* (2013.01); *G02B 27/18* (2013.01); *G03B 21/14* (2013.01)

(58) Field of Classification Search
CPC .... G03B 21/142; G03B 21/145; G03B 21/14; G02B 26/0875; G02B 26/0883; G02B 7/02; G02B 7/023; H04N 9/3188
See application file for complete search history.

(56) References Cited

U.S. PATENT DOCUMENTS

2020/0174246 A1* 6/2020 Wakabayashi ......... G02B 26/08

FOREIGN PATENT DOCUMENTS

CN 103827725 5/2014

* cited by examiner

*Primary Examiner* — Ryan D Howard
(74) *Attorney, Agent, or Firm* — JCIPRNET

(57) ABSTRACT

An optical module includes a frame body and an optical element. The frame body includes at least one fixing portion, at least one frame portion and at least one shaft portion connected to the fixing portion and the frame portion. The frame portion includes at least one main body, a plurality of positioning structures and at least one reinforcement structure. A part of an inner side surface of the main body is bended toward a thickness direction of the frame body to form the positioning structures, and the reinforcement structure is connected to the main body and extends in the thickness direction. The frame portion oscillates relative to the fixing portion around the shaft portion. In the thickness direction, a sum of a height of the reinforcement structure and a thickness of the main body is greater than a thickness of the shaft portion.

20 Claims, 10 Drawing Sheets

OPTICAL MODULE AND PROJECTION DEVICE

CROSS-REFERENCE TO RELATED APPLICATION

This application claims the priority benefit of China application serial no. 201920859110.1, filed on Jun. 10, 2019. The entirety of the above-mentioned patent application is hereby incorporated by reference herein and made a part of this specification.

BACKGROUND

Technical Field

The invention relates to an optical module and a projection device, and particularly relates to an optical module capable of adjusting a deflection angle of an optical element and a projection device using the optical module.

Description of Related Art

Generally, an actuator is set in a projector, and an image beam may pass through the glass on the actuator. When a driving element of the actuator is actuated, a shaft portion of a frame body is twisted, so that the glass carried by the frame body is rapidly oscillated back and forth, and the image beam is refracted to another position by the glass, thereby achieving an effect of increasing a resolution of a projected image of the projector. When a material of the frame body is metal, since the metal is a material with a uniform thickness, when the actuator is actuated, structural strengths of a frame portion of the frame body and the shaft portion are similar, so that the frame portion and the shaft portion are simultaneously deformed, which affects actuation stability and a reaction speed of the actuator.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention is directed to an optical module, which has good actuation stability and a fast response speed.

The invention is directed to a projection device including the aforementioned optical module, which is adapted to increase image resolution.

Other objects and advantages of the invention may be further illustrated by the technical features broadly embodied and described as follows.

In order to achieve one or a portion of or all of the objects or other objects, an embodiment of the invention provides an optical module including a frame body and an optical element. The frame body includes at least one fixing portion, at least one frame portion and at least one shaft portion. The frame portion includes at least one main body, a plurality of positioning structures and at least one reinforcement structure. A part of an inner side surface of the main body is bended toward a thickness direction of the frame body to form the positioning structures, and the reinforcement structure is connected to the main body and extends in the thickness direction. The shaft portion is connected to the fixing portion and the frame portion. The frame portion is configured to oscillate relative to the fixing portion around the shaft portion. In the thickness direction, a sum of a height of the reinforcement structure and a thickness of the main body is greater than a thickness of the shaft portion, and one of following conditions is satisfied: the reinforcement structure and the at least one positioning structure extend in a direction perpendicular to an extending direction of the shaft portion and the thickness direction, and viewing from the extending direction of the shaft portion, the reinforcement structure and the at least one positioning structure are continuous from one end of a part of the frame portion to another end thereof in the direction perpendicular to the extending direction of the shaft portion and perpendicular to the thickness direction; alternatively, the reinforcement structure extends in the direction perpendicular to the extending direction of the shaft portion and the thickness direction, and viewing from the extending direction of the shaft portion, the reinforcement structure is continuous from one end of a part of the frame portion to another end thereof in the direction perpendicular to the extending direction of the shaft portion and perpendicular to the thickness direction. The optical element is disposed on the frame body and located in the frame portion, where a periphery of the optical element leans against the positioning structures.

In order to achieve one or a portion of or all of the objects or other objects, an embodiment of the invention provides a projection device including an illumination system, a light valve, a projection lens and an optical module. The illumination system is configured to provide an illumination beam, and the light valve is configured to convert the illumination beam into an image beam. The projection lens is configured to project the image beam out of the projection device. The optical module is disposed between the light valve and the projection lens, and includes a frame body and an optical element. The frame body includes at least one fixing portion, at least one frame portion and at least one shaft portion. The frame portion includes at least one main body, a plurality of positioning structures and at least one reinforcement structure. A part of an inner side surface of the main body is bended toward a thickness direction of the frame body to form the positioning structures, and the reinforcement structure is connected to the main body and extends in the thickness direction. The shaft portion is connected to the fixing portion and the frame portion. The frame portion is configured to oscillate relative to the fixing portion around the shaft portion. In the thickness direction, a sum of a height of the reinforcement structure and a thickness of the main body is greater than a thickness of the shaft portion, and one of following conditions is satisfied: the reinforcement structure and the at least one positioning structure extend in a direction perpendicular to an extending direction of the shaft portion and the thickness direction, and viewing from the extending direction of the shaft portion, the reinforcement structure and the at least one positioning structure are continuous from one end of a part of the frame portion to another end thereof in the direction perpendicular to the extending direction of the shaft portion and perpendicular to the thickness direction; alternatively, the reinforcement structure extends in the direction perpendicular to the extending direction of the shaft portion and the thickness direction, and viewing from the extending direction of the shaft portion, the reinforcement structure is continuous from one end of a part of the frame portion to another end thereof in the direction perpendicular to the extending direction of the shaft portion and perpendicular to the thickness direction. The optical element is disposed on the frame body and located in the frame portion, and is located on a transmission path of the image beam, where a periphery of the optical element leans against the positioning structures.

Based on the above description, the embodiments of the invention have at least one of following advantages or effects. In the optical module of the invention, a sum of the height of the reinforcement structure and the thickness of the main body of the frame portion is greater than the thickness of the shaft portion. Namely, under the principle that the thickness is proportional to structural strength, a structural strength of the shaft portion of the frame body is smaller than a structural strength of the frame portion. In this way, when the optical module is actuated, the shaft portion will withstand most of a deformation stress relative to the frame portion, so as to improve the actuation stability and a response speed of the optical module. On the other hand, the projection device adopting the optical module may increase a resolution of an image projected by the projector.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
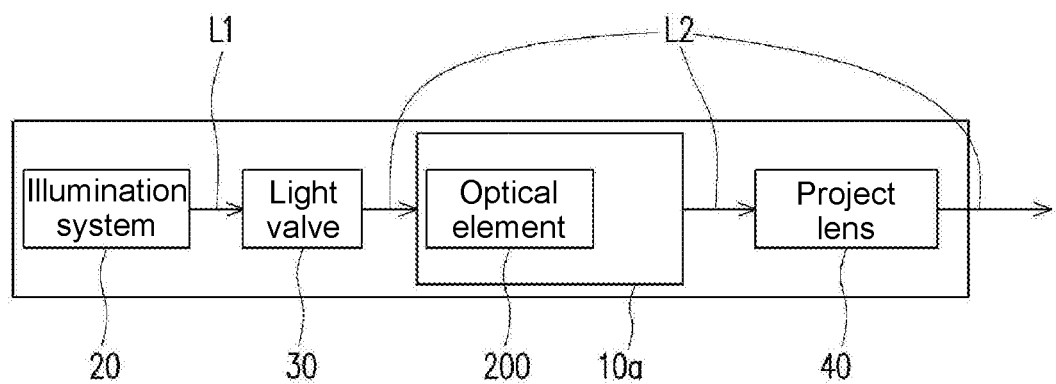
FIG. 1 is a schematic diagram of a projection device according to an embodiment of the invention.

FIG. 1 is a schematic diagram of a projection device according to an embodiment of the invention. Referring to FIG. 1, in the embodiment, the projection device PR includes an optical module 10a, an illumination system 20, a light valve 30 and a projection lens 40. To be specific, the optical module 10a is disposed between the light valve 30 and the projection lens 40, and includes an optical element 200. The illumination system 20 is configured to provide an illumination beam L1, and the light valve 30 is configured to convert the illumination beam L1 into an image beam L2. The optical element 200 of the optical module 10a is located on a transmission path of the image beam L2, and the projection lens 40 is configured to project the image beam L2 out of the projection device PR.

Figure 2A:
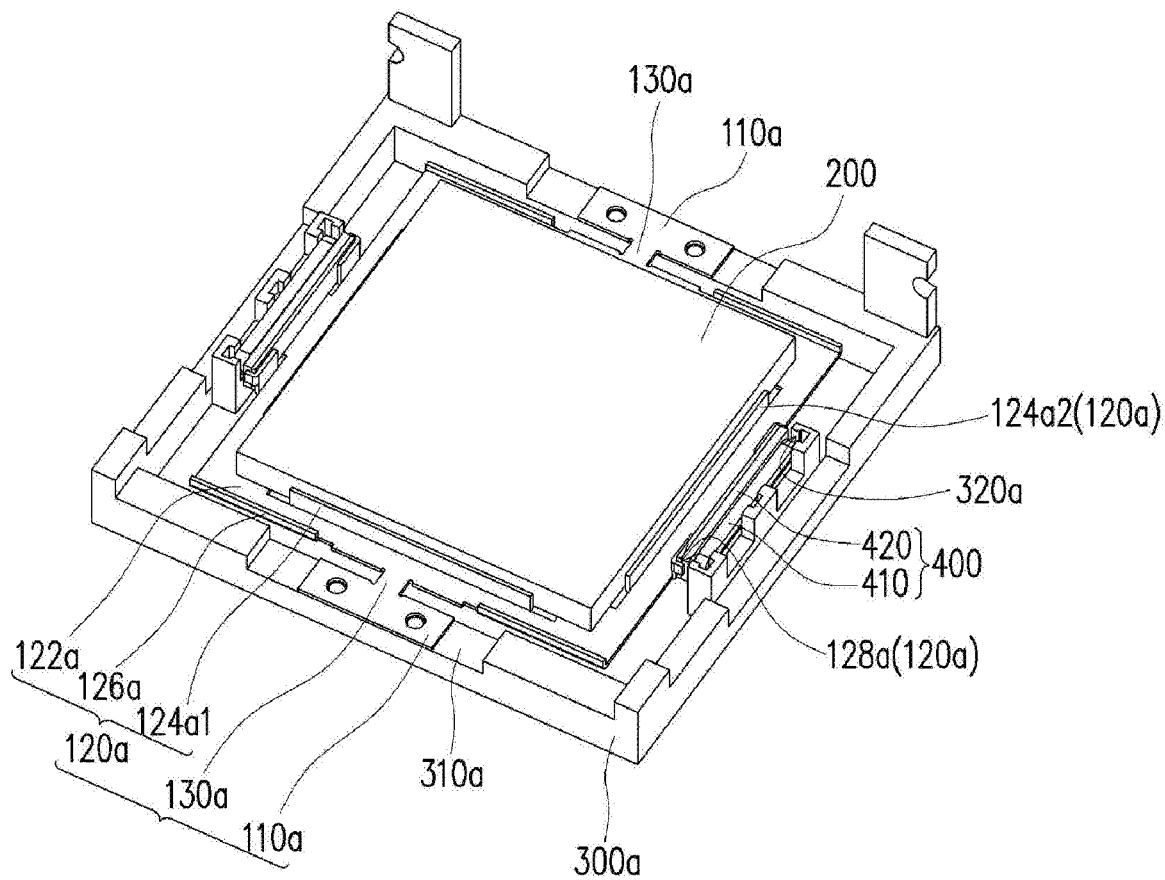
FIG. 2A is a three-dimensional view of an optical module of FIG. 1.
Figure 2B:
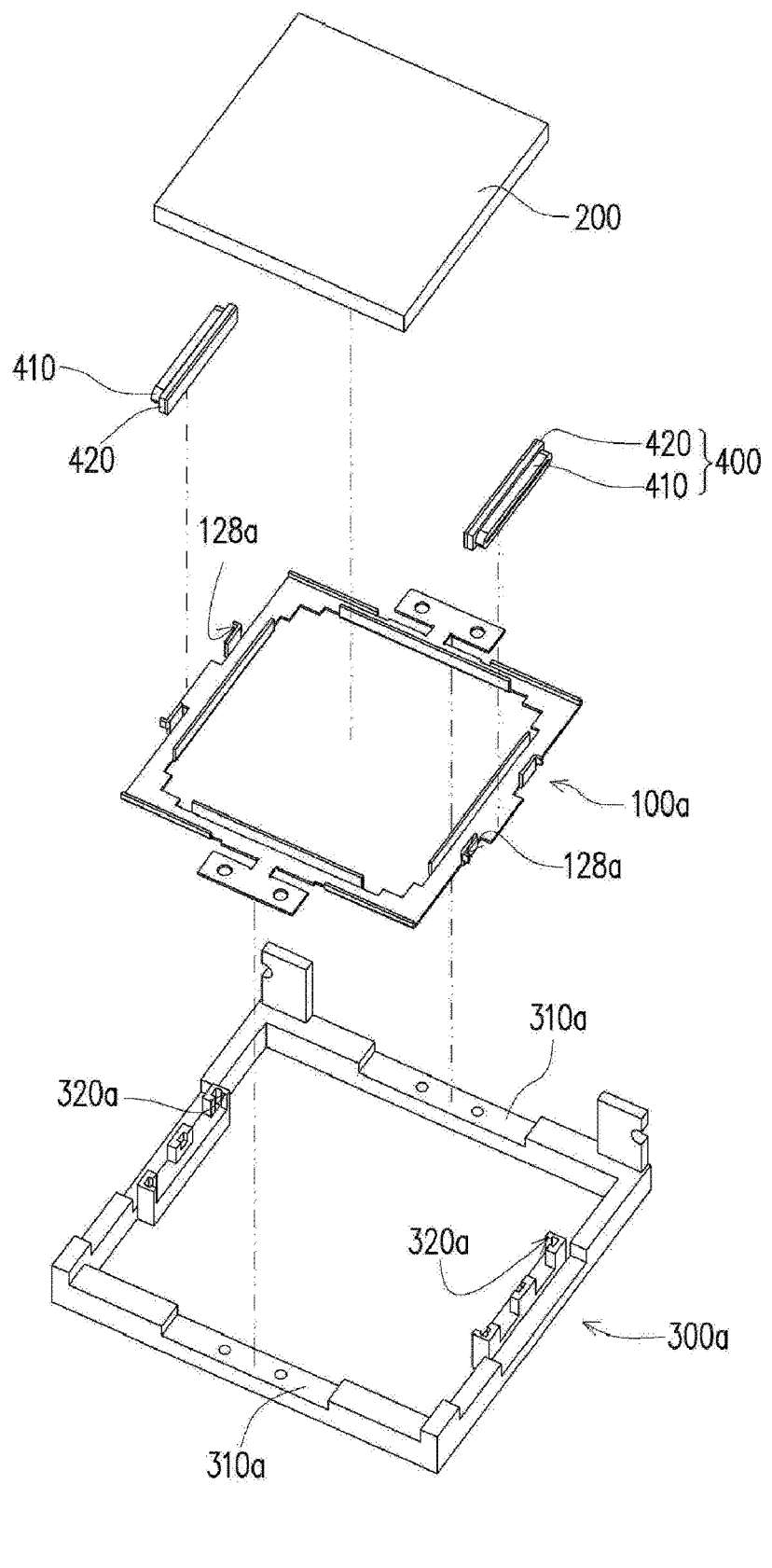
FIG. 2B is an exploded view of the optical module of FIG. 2A.
Figure 2C:
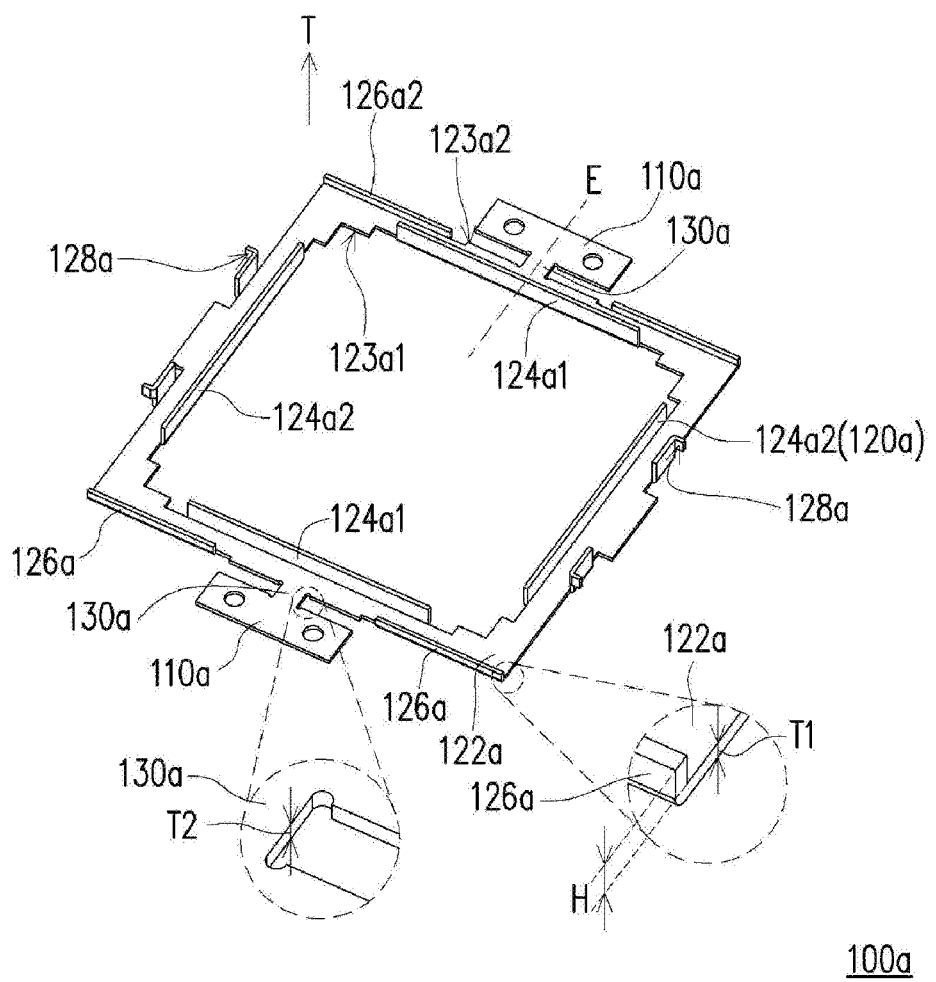
FIG. 2C is a three-dimensional view of a frame body of FIG. 2A.

FIG. 2A is a three-dimensional view of the optical module of FIG. 1. FIG. 2B is an exploded view of the optical module of FIG. 2A. FIG. 2C is a three-dimensional view of a frame body of FIG. 2A. Referring to FIG. 2A, FIG. 2B and FIG. 2C, the frame body 100a of the optical module 10a of the embodiment includes at least one fixing portion (two fixing portions 110a are schematically illustrated), at least one frame portion (one frame portion 120a is schematically illustrated) and at least one shaft portion (two shaft portions 130a are schematically illustrated), where the fixing portions 110a, the frame portion 120a and the shaft portions 130a are formed integrally, and a material of the frame body 100a is, for example, metal. The shaft portion 130a only has one extending direction E (shown in FIG. 2C), so that the optical module 10a may be regarded as a uniaxial actuator.

In detail, the frame portion 120a of the frame body 100a includes at least one main body (one main body 122a is schematically illustrated), a plurality of positioning structures (two positioning structures 124a1 and two positioning structures 124a2 are schematically illustrated) and at least one reinforcement structure (a plurality of reinforcement structures 126a are schematically illustrated). A part of an inner side surface 123a1 of the main body 122a is bended toward a thickness direction T of the frame body 100a to form the positioning structures 124a1 and 124a2, and a part of an outer side surface 123a2 of the main body 122a is bended toward the thickness direction T (shown in FIG. 2C) to form the reinforcement structures 126a. The shaft portions 130a are connected to the fixing portions 110a and the outer side surface 123a2 of the main body 122a of the frame portion 120a, and the frame portion 120a is configured to oscillate relative to the fixing portions 110a around the shaft portion 130a. The optical element 200 is disposed on the frame body 100a and located in the frame portion 120a, where a periphery of the optical element 200 leans against the positioning structures 124a1 and 124a2.

Particularly, the reinforcement structures 126a of the embodiment are separately connected to the main body 122a and extend in the thickness direction T. In the thickness direction T, a sum of a height H of the reinforcement structure 126a and a thickness T1 of the main body 122a is greater than a thickness T2 (shown in FIG. 2C) of the shaft portion 130a, where the thickness T1 is equal to the thickness T2. Moreover, in the thickness direction T, the height H of the reinforcement structure 126a is 1 time or more of the thickness T1 of the main body 122a. In other words, under the principle that the thickness is proportional to structural strength, a structural strength of the shaft portion 130a of the frame body 100a is smaller than a structural strength of the frame portion 120a. In this way, when the optical module 10a is actuated, the shaft portion 130a will withstand most of a deformation stress relative to the frame portion 120a, so as to improve actuation stability and a response speed of the optical module 10a.

Further, referring to FIG. 2C, in order to make the structural strength of the frame portion 120a near the shaft portion 130a continuous and uninterrupted, the reinforcement structures 126a and the positioning structures 124a1 of the embodiment extend in a direction perpendicular to the extending direction E of the shaft portion 130a and the thickness direction T, and viewing from the extending direction E of the shaft portion 130a, the reinforcement structures 126a and the positioning structures 124a1 are continuous from one end of a part of the frame portion 120a to another end thereof in the direction perpendicular to the extending direction E of the shaft portion 130a and perpendicular to the thickness direction T. On the other hand, viewing from the extending direction E of the shaft portion 130a, the positioning structures 124a1 located on the inner side surface 123a1 of the main body 122a and the reinforcement structures 126a located on the outer side surface 123a2 of the main body 122a are partially overlapped.

Moreover, referring to FIG. 2A and FIG. 2B, the optical module 10a of the embodiment further includes a base body 300a, where the base body 300a surrounds the frame body 100a, and the fixing portions 110a are fixed on the base body 300a. Further, the base body 300a of the embodiment includes two positioning portions 310a and two assembling portions 320a, where the fixing portions 110a may be respectively fixed to the base body 300a through a securing member (for example, a screw, which is not shown).

Moreover, the optical module 10a further includes at least one driving assembly (two driving assemblies 400) are schematically illustrated, and the frame portion 120a further includes two assembling portions 128a. The driving assemblies 400 are disposed on the base body 300a and the frame portion 120a of the frame body 100a, and are clamped between the assembling portions 320a and the assembling portions 128a. The frame portion 120a is configured to oscillate relative to the base body 300a through a magnetic force generated by the driving assemblies 400. Each of the driving assemblies 400 includes at least one coil (one coil 410 is schematically illustrated) and at least one magnet (one magnet 420 is schematically illustrated).

In brief, in the design of the optical module 10a of the embodiment, a sum of the height H of the reinforcement structure 126a of the frame portion 120a and the thickness T1 of the main body 122a is greater than the thickness of the shaft portion 130a. Namely, the reinforcement structures 126a formed by bending the outer side surface 123a2 of the main body 122a toward the thickness direction T may enhance a structural strength of the frame portion 120a. Therefore, when the optical module 10a is actuated, compared to the frame portion 120a, the shaft portion 130a may withstand most of a deformation stress, so as to improve actuation stability and a response speed of the optical module 10a. The projection device PR (shown in FIG. 1) adopting the optical module 10a may increase image resolution.

It should be noted that reference numbers of the components and a part of contents of the aforementioned embodiment are also used in the following embodiment, wherein the same reference numbers denote the same or like components, and descriptions of the same technical contents are omitted. The aforementioned embodiment may be referred for descriptions of the omitted parts, and detailed descriptions thereof are not repeated in the following embodiment.

Figure 3:
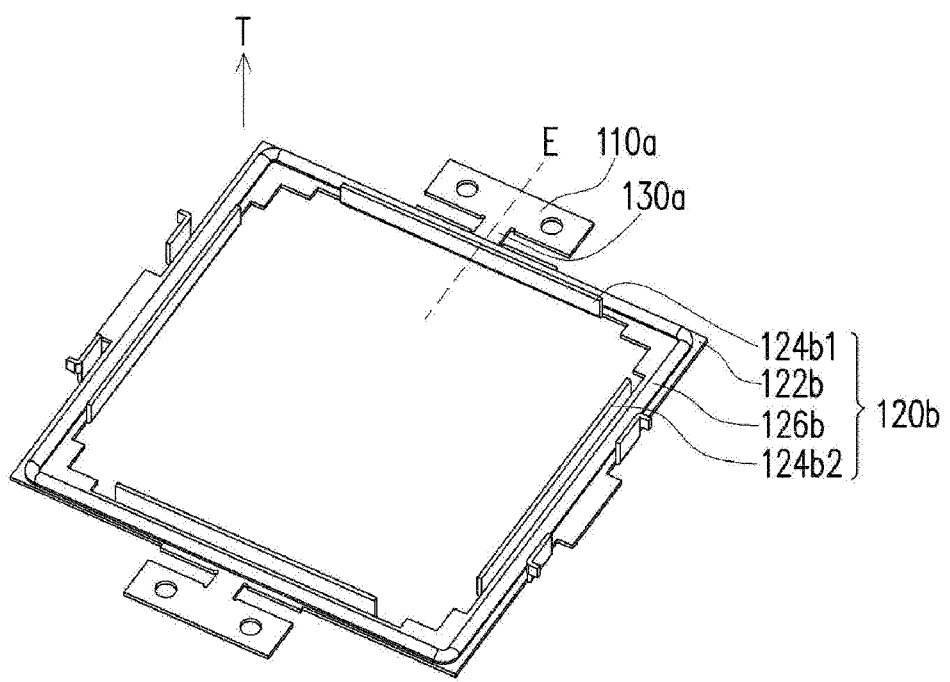
FIG. 3 is a three-dimensional view of a frame body according to another embodiment of the invention.

FIG. 3 is a three-dimensional view of a frame body according to another embodiment of the invention. Referring to FIG. 2C and FIG. 3, the frame body 100b of the embodiment is similar to the frame body 100a of FIG. 2C, and a difference there between is that a structural pattern of a reinforcement structure 126b of the embodiment is different to that of the reinforcement structure 126a of FIG. 2C. In detail, the frame portion 120b of the embodiment includes a main body 122b, positioning structures 124b1, 124b2 and the reinforcement structure 126b, where the reinforcement structure 126b is formed by the main body 122b by protruding toward the thickness direction T, which may be regarded as an extension structure. To be specific, the reinforcement structure 126b of the embodiment extends in a direction perpendicular to the extending direction E of the shaft portion 130a and the thickness direction T, and viewing from the extending direction E of the shaft portion 130a, the reinforcement structure 126b is continuous from one end of a part of the frame portion 120b to another end thereof in the direction perpendicular to the extending direction E of the shaft portion 130a and perpendicular to the thickness direction T. In the embodiment, the reinforcement structure 126b is a ring-like structure, but the invention is not limited thereto. For example, since the reinforcement structure 126b is at least required to be continuous from one end of a part of the frame portion 120b to another end thereof in the direction perpendicular to the extending direction E of the shaft portion 130a and perpendicular to the thickness direction T, in other embodiments that are not illustrated, other parts of the frame portion 120b may be not configured with the reinforcement structure 126b, or the reinforcement structure 126b configured at other part of the frame portion 120b may be discontinuous, so that the reinforcement structures 126b may be a plurality of structures separated from each other but connected to the main body 122b.

Moreover, in other embodiment that is not illustrated, the frame portion may be simultaneously configured with the reinforcement structures 126a and the reinforcement structures 126b, and in case that the positioning structures are not configured on the frame portion in the direction perpendicular to the extending direction E of the shaft portion and the thickness direction T, viewing from the extending direction E of the shaft portion 130a, the reinforcement structures 126a and the reinforcement structures 126b are continuous from one end of a part of the frame portion to another end thereof in the direction perpendicular to the extending direction E of the shaft portion 130a and perpendicular to the thickness direction T. On the other hand, viewing from the extending direction E of the shaft portion 130a, the reinforcement structures 126a located on the outer side surface of the main body may be partially overlapped with the reinforcement structures 126b protruding from the main body in the thickness direction T.

Figure 4A:
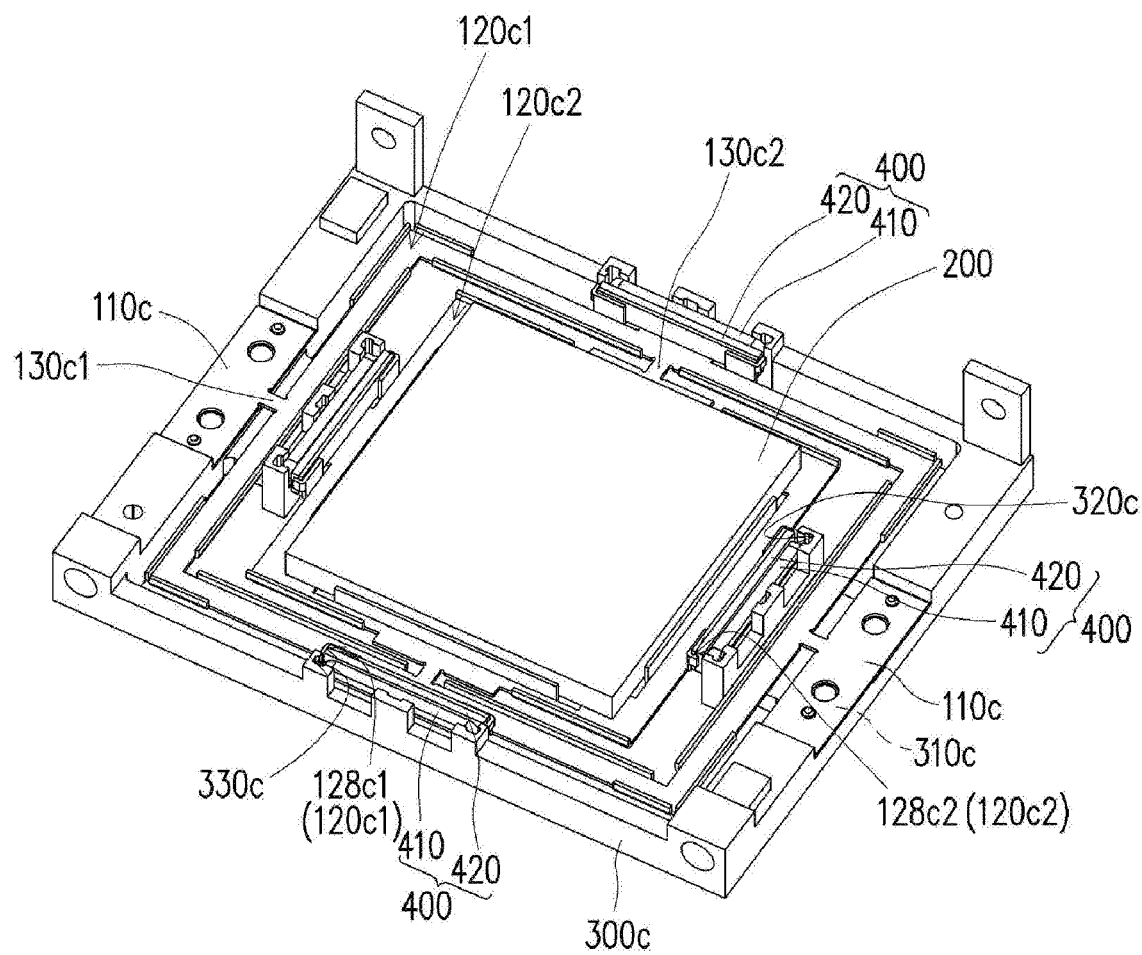
FIG. 4A is a three-dimensional view of an optical module according to another embodiment of the invention.
Figure 4B:
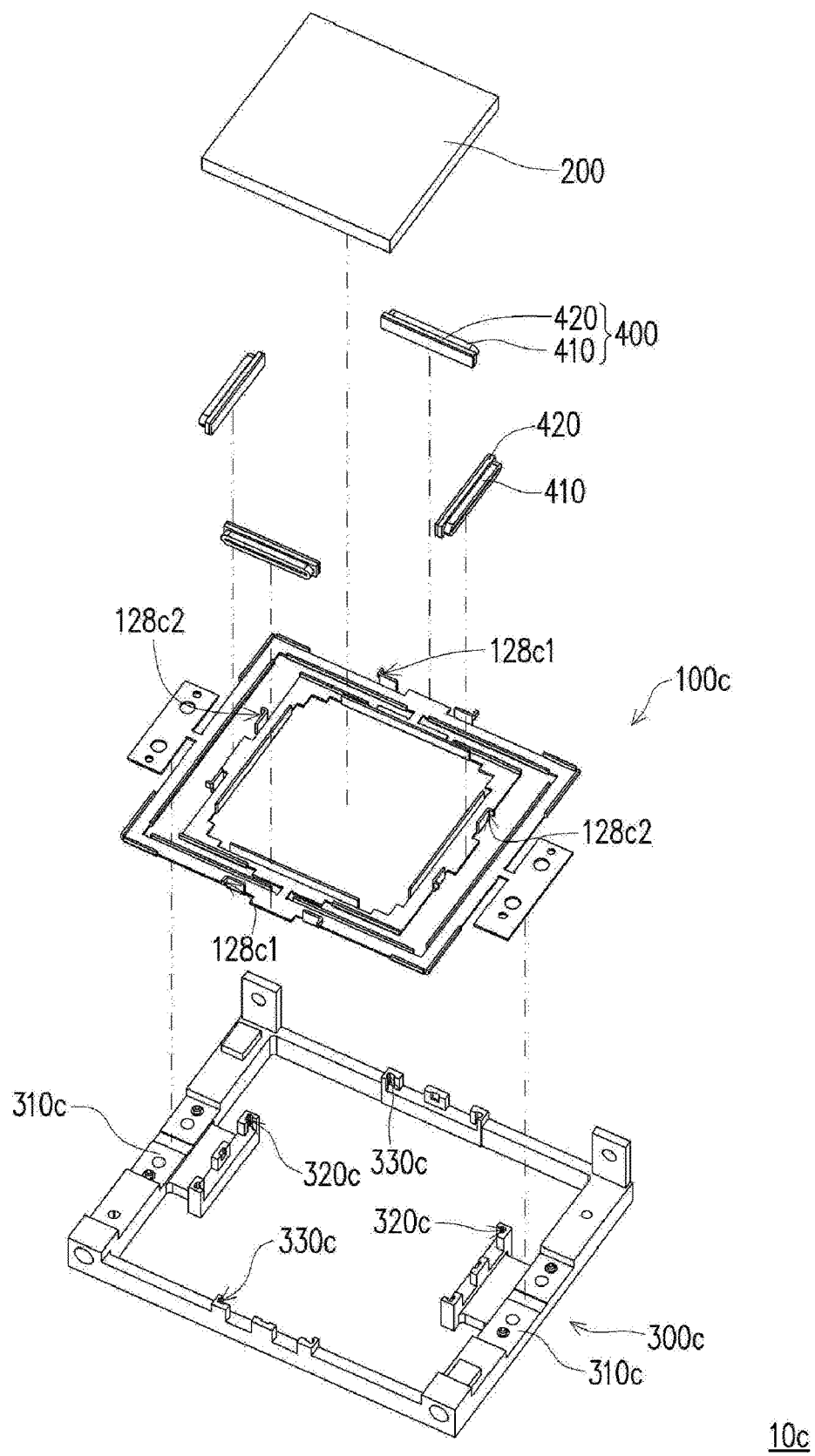
FIG. 4B is a three-dimensional exploded view of the optical module of FIG. 4A.
Figure 4C:
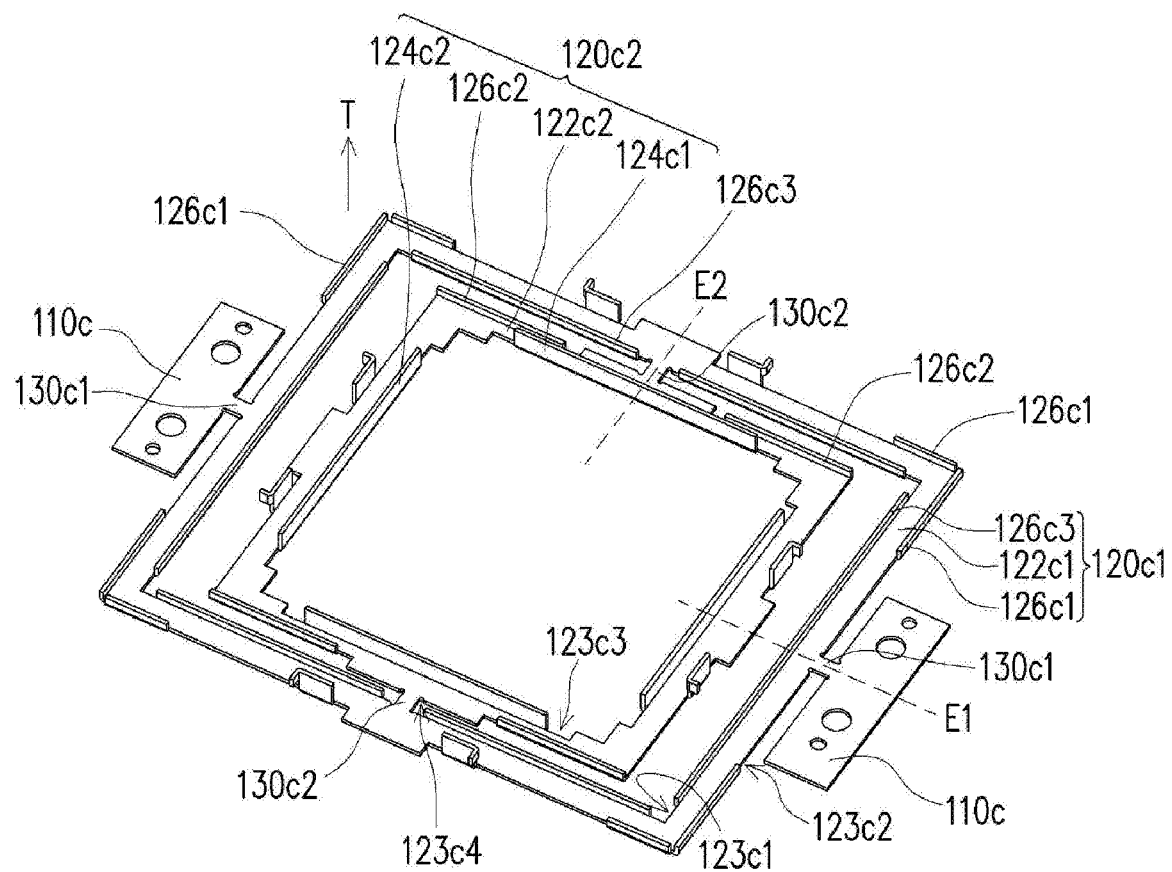
FIG. 4C is a three-dimensional view of a frame body of FIG. 4A.

FIG. 4A is a three-dimensional view of an optical module according to another embodiment of the invention. FIG. 4B is a three-dimensional exploded view of the optical module of FIG. 4A. FIG. 4C is a three-dimensional view of the frame body of FIG. 4A. Referring to FIG. 2A, FIG. 2C, FIG. 4A and FIG. 4C, the optical module 10c of the embodiment is similar to the optical module 10a of FIG. 2A, and a difference there between is that the optical module 10c of the embodiment has shaft portions of two different extending directions, which may be regarded as a biaxial actuator.

In detail, referring to FIG. 4A, FIG. 4B and FIG. 4C, the frame body 100c includes at least one fixing portion (two fixing portions 110c are schematically illustrated), a first frame portion 120c1, a second frame portion 120c2, at least one first shaft portion (two first shaft portions 130c1 are schematically illustrated) and at least one second shaft portion (two second shaft portions 130c2 are schematically illustrated). The first frame portion 120c1 is fixed to the fixing portion 110c through the first shaft portions 130c1, and the second frame portion 120c2 is fixed to the first frame portion 120c1 through the second shaft portions 130c2. Namely, the first frame portion 120c1 may be regarded as an outer frame, and the second frame portion 120c2 may be regarded as an inner frame. The optical element 200 is located in the second frame portion 120c2, and a first extending direction E1 of the first shaft portion 130c1 is different to an extending direction E2 of the second shaft portion 130c2.

Further, the first frame portion 120c1 includes a first main body 122c1, first reinforcement structures 126c1 and third reinforcement structures 126c3. The first main body 122c1 has a first inner side surface 123c1 and a first outer side surface 123c2 opposite to each other. A part of the first outer side surface 123c2 of the first main body 122c1 is bended toward the thickness direction T to form the first reinforcement structures 126c1 separated from each other, and a part of the first inner side surface 123c1 of the first main body 122c1 is bended toward the thickness direction T to form the third reinforcement structures 126c3 separated from each other. The first shaft portions 130c1 are connected to the first outer side surface 123c2 of the first main body 122c1 and the fixing portions 110c.

The second frame portion 120c2 includes a second main body 122c2, positioning structures 124c1 and 124c2 and second reinforcement structures 126c2. The second main body 122c2 has a second inner side surface 123c3 and a second outer side surface 123c4 opposite to each other. A part of the second outer side surface 123c4 of the second main body 122c2 is bended toward the thickness direction T to form the second reinforcement structures 126c2 separated from each other, and a part of the second inner side surface 123c3 of the second main body 122c2 is bended toward the thickness direction T to form the positioning structures 124c1 and 124c2 separated from each other. The second shaft portions 130c2 are connected to the first inner side surface 123c1 of the first main body 122c1 and the second outer side surface 123c4 of the second main body 122c2.

Further, in order to make the structural strength of the first frame portion 120c1 near the first shaft portion 130c1 continuous and uninterrupted, in the embodiment, the first reinforcement structures 126c1 and the third reinforcement structures 126c3 extend in a direction perpendicular to the first extending direction E1 of the first shaft portion 130c1 and the thickness direction T, and viewing from the first extending direction E1, the first reinforcement structures 126c1 and the third reinforcement structures 126c3 are continuous from one end of a part of the first frame portion 120c1 to another end thereof in the direction perpendicular to the first extending direction E1 and perpendicular to the thickness direction T. On the other hand, viewing from the first extending direction E1 of the first shaft portion 130c1, the first reinforcement structures 126c1 located on the first outer side surface 123c2 of the first main body 122c1 and the third reinforcement structures 126c3 located on the first inner side surface 123c1 of the first main body 122c1 are partially overlapped.

In order to make the structural strength of the first frame portion 120c1 and the second frame portion 120c2 near the second shaft portion 130c2 continuous and uninterrupted, the first reinforcement structures 126c1 and the third reinforcement structures 126c3 extend in a direction perpendicular to the second extending direction E2 of the second shaft portion 130c2 and the thickness direction T, and viewing from the second extending direction E2, the first reinforcement structures 126c1 and the third reinforcement structures 126c3 are continuous from one end of a part of the first frame portion 120c1 to another end thereof in the direction perpendicular to the second extending direction E2 and perpendicular to the thickness direction T. Moreover, another design of making the structural strength of the first frame portion 120c1 and the second frame portion 120c2 near the second shaft portion 130c2 continuous and uninterrupted is that the second reinforcement structures 126c2 and the positioning structures 124c1 extend in the direction perpendicular to the second extending direction E2 of the second shaft portion 130c2 and the thickness direction T, and viewing from the second extending direction E2, the second reinforcement structures 126c2 and the positioning structures 124c1 are continuous from one end of a part of the second frame portion 120c2 to another end thereof in the direction perpendicular to the second extending direction E2 and perpendicular to the thickness direction T. On the other hand, viewing from the second extending direction E2 of the second shaft portion 130c2, the first reinforcement structures 126c1 located on the first outer side surface 123c2 of the first main body 122c1 and the third reinforcement structures 126c3 located on the first inner side surface 123c1 of the first main body 122c1 are partially overlapped, and the second reinforcement structures 126c2 located on the second outer side surface 123c4 of the second main body 122c2 and the positioning structures 124c1 located on the second inner side surface 123c3 of the second main body 122c2 are partially overlapped.

Moreover, referring to FIG. 4A and FIG. 4B, the base body 300c of the embodiment includes two positioning portions 310c, two assembling portions 320c and two assembling portions 330c. The fixing portions 110c of the frame body 100d may be fixed to the positioning portions 310c of the base body 300c through securing members (for example, screws, which are not shown). The optical module 10c includes four driving assemblies 400, where two driving assemblies 400 are clamped between the assembling portions 320c of the base body 300c and second assembling portions 128c2 of the second frame portion 120c2, and other two driving assemblies 400 are clamped between the assembling portions 330c of the base body 300c and first assembling portions 128c1 of the first frame portion 120c1. The first frame portion 120c1 and the second frame portion 120c2 are adapted to oscillate relative to the base body 300c by magnetic forces generated by the drive assemblies 400.

In brief, in the design of the optical module 10c of the embodiment, the structural strength of the first frame portion 120c1 is enhanced through the first reinforcement structures 126c1 and the third reinforcement structures 126c3 formed by bending the first outer side surface 123c2 and the first inner side surface 123c1 of the first main body 122c1 toward the thickness direction T. The structural strength of the second frame portion 120c2 is enhanced through the second reinforcement structures 126c2 formed by bending the second outer side surface 123c4 of the second main body 122c2 toward the thickness direction T. The design of the first reinforcement structures 126c1, the second reinforcement structures 126c2 and the third reinforcement structures 126c3 may effectively enhance the structural strength without increasing a width or a material thickness of the frame body 100c, so as to save a space and material. Therefore, when the optical module 10c is actuated, compared to the first frame portion 120c1 and the second frame portion 120c2, the first shaft portion 130c1 and the second shaft portion 130c2 will withstand most of a deformation stress, so as to improve the actuation stability and a response speed of the optical module 10c.

Figure 5A:
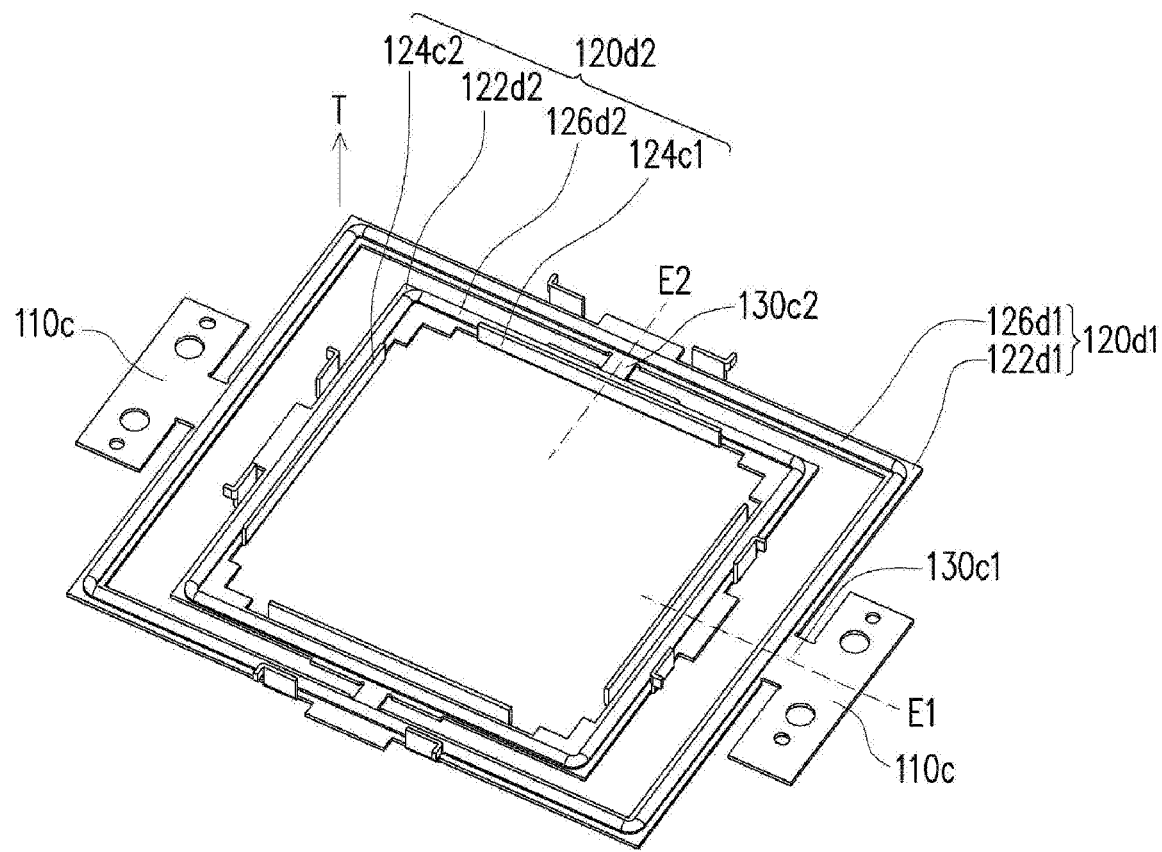
FIG. 5A is a three-dimensional view of a frame body according to another embodiment of the invention.

FIG. 5A is a three-dimensional view of a frame body according to another embodiment of the invention. Referring to FIG. 4C and FIG. 5A, the frame body 100d of the embodiment is similar to the frame body 100c of FIG. 4C, and differences there between are that in the first frame portion 120d1 of the embodiment, the first reinforcement structure 126d1 is used to replace the first reinforcement structures 126c1 and the third reinforcement structures 126c3 of the embodiment of FIG. 4C, and in the second frame portion 120d2 of the embodiment, the second reinforcement structure 126d2 is used to replace the second reinforcement structures 126c2 of the embodiment of FIG. 4C, and structure patterns of the first reinforcement structure 126d1 and the second reinforcement structure 126d2 of the embodiment are different to the structure patterns of the first reinforcement structures 126c1, the third reinforcement structures 126c3 and the second reinforcement structures 126c2 of FIG. 4C.

In detail, the first reinforcement structure 126d1 is formed by the first main body 122d1 of the first frame portion 120d1 by protruding toward the thickness direction T, which may be regarded as an extension structure. The second reinforcement structure 126d2 is formed by the second main body 122d2 of the second frame portion 120d2 by protruding toward the thickness direction T, which may be regarded as an extension structure. To be specific, the first reinforcement structure 126d1 of the embodiment extends in a direction perpendicular to the first extending direction E1 of the first shaft portion 130c1 and the thickness direction T, and viewing from the first extending direction E1 of the first shaft portion 130c1, the first reinforcement structure 126d1 is continuous from one end of a part of the first frame portion 120d1 to another end thereof in the direction perpendicular to the first extending direction E1 of the first shaft portion 130c1 and perpendicular to the thickness direction T. Moreover, the first reinforcement structure 126b1 extends in the direction perpendicular to the second extending direction E2 of the second shaft portion 130c2 and the thickness direction T, and viewing from the second extending direction E2 of the second shaft portion 130c2, the first reinforcement structure 126d1 is continuous from one end of a part of the first frame portion 120d1 to another end thereof in the direction perpendicular to the second extending direction E2 of the second shaft portion 130c2 and perpendicular to the thickness direction T. The second reinforcement structure 126d2 extends in a direction perpendicular to the second extending direction E2 of the second shaft portion 130c2 and the thickness direction T, and viewing from the second extending direction E2 of the second shaft portion 130c2, the second reinforcement structure 126d2 is continuous from one end of a part of the second frame portion 120d2 to another end thereof in the direction perpendicular to the second extending direction E2 of the second shaft portion 130c2 and perpendicular to the thickness direction T. The design of the first reinforcement structure 126d1 and the second reinforcement structure 126d2 may effectively enhance the structural strength without increasing a width or a material thickness of the frame body 100d, so as to save a space and material, where the first reinforcement structure 126d1 and the second reinforcement structure 126d2 are respectively a ring-like structure, but the invention is not limited thereto. For example, in other embodiments that are not illustrated, the second reinforcement structure 126d2 may not be configured on the part of the second frame portion 120d2 parallel to the second extending direction E2 of the second shaft portion 130c2. Alternatively, the second reinforcement structure 126d2 configured on the part of the second frame portion 120d2 parallel to the second extending direction E2 of the second shaft portion 130c2 may not be continuous, which does not affect the structural strength of the second frame portion 120d2 near the second shaft portion 130c2 to be continuous and uninterrupted, so that the second reinforcement structure 126d2 may be a plurality of structures separated from each other but connected to the second main body 122d2.

Figure 5B:
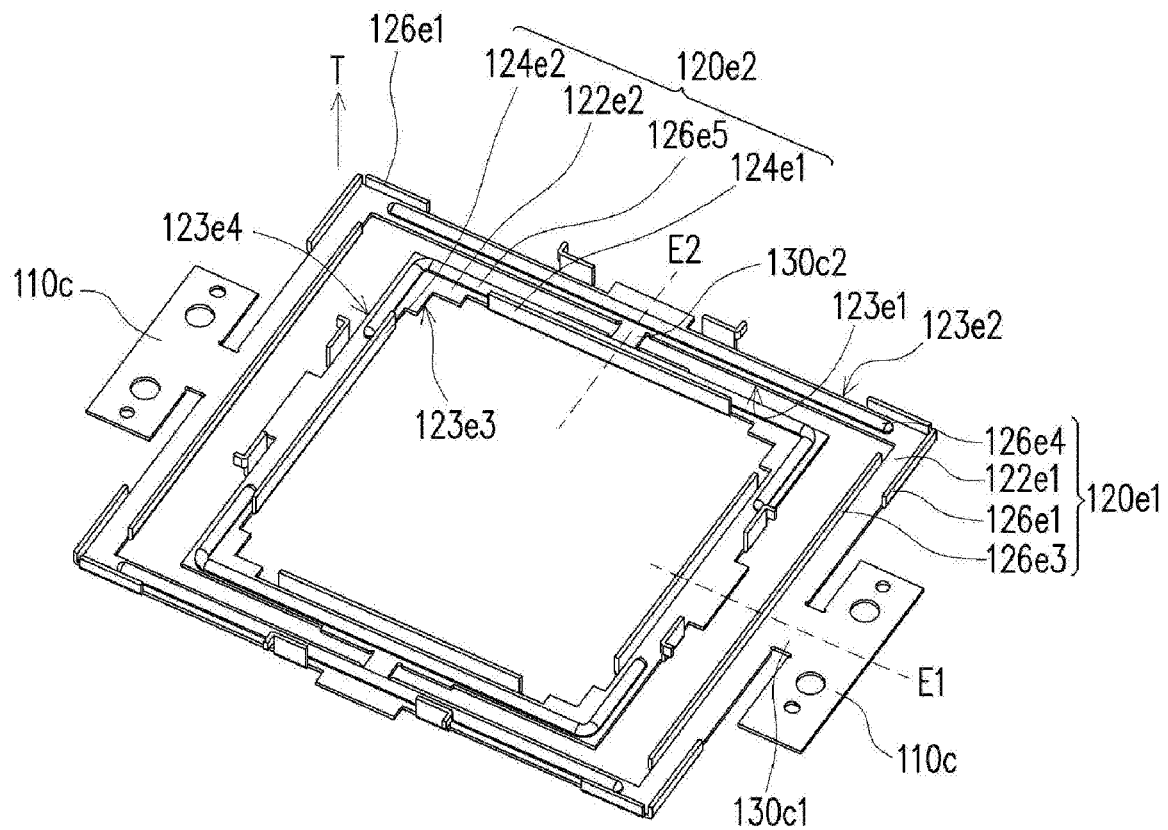
FIG. 5B is a three-dimensional view of a frame body according to another embodiment of the invention.

FIG. 5B is a three-dimensional view of a frame body according to another embodiment of the invention. Referring to FIG. 4C and FIG. 5B, the frame body 100e of the embodiment is similar to the frame body 100c of FIG. 4C, and differences there between are that the first frame portion 120e1 of the embodiment further includes fourth reinforcement structures 126e4, and the second frame portion 120e2 further includes fifth reinforcement structures 126e5, in addition, although the second reinforcement structures 126c2 of FIG. 4C are not illustrated in FIG. 5B, the embodiment of FIG. 5B may include the second reinforcement structures 126c2 of FIG. 4C.

In detail, a part of the first outer side surface 123e2 of the first main body 122e1 of the first frame portion 120e1 is bended toward the thickness direction T to form the first reinforcement structures 126e1 separated from each other. A part of the first inner side surface 123e1 of the first main body 122e1 of the first frame portion 120e1 is bended toward the thickness direction T to form the third reinforcement structures 126e3 separated from each other. The first main body 122e1 is protruded toward the thickness direction T to form the fourth reinforcement structures 126e4 separated from each other. A part of the second inner side surface 123e3 of the second main body 122e2 of the second frame portion 120e2 is bended toward the thickness direction T to form the positioning structures 124e1 and 124e2. The second main body 122e2 is protruded toward the thickness direction T to form the fifth reinforcement structures 126e5 separated from each other. Moreover, although not illustrated, the second reinforcement structures 126c2 of FIG. 4C may also be configured on the second outer side surface 123e4 of the second main body 122e2 of the second frame portion 120e2. Namely, a part of the second outer side surface 123e4 of the second main body 122e2 of the second frame portion 120e2 may be bended toward the thickness direction T to form the second reinforcement structures 126c2.

Further, as shown in FIG. 5B, the first reinforcement structures 126e1 and the third reinforcement structures 126e3 of the embodiment extend in a direction perpendicular to the first extending direction E1 of the first shaft portion 130c1 and the thickness direction T, and viewing from the first extending direction E1, the first reinforcement structures 126e1 and the third reinforcement structures 126e3 are continuous from one end of a part of the first frame portion 120e1 to another end thereof in the direction perpendicular to the first extending direction E1 and perpendicular to the thickness direction T. On the other hand, viewing from the first extending direction E1 of the first shaft portion 130c1, the third reinforcement structures 126e3 located on the first inner side surface 123e1 of the first main body 122e1 and the first reinforcement structures 126e1 located on the first outer side surface 123e2 of the first main body 122e1 are partially overlapped.

Moreover, although the fourth reinforcement structures 126e4 in FIG. 5B are not arranged on the first frame portion 120e1 at the part perpendicular to the first extending direction E1 of the first shaft portion 130c1 and the thickness direction T, in the embodiment, distribution of different types of reinforcement structures may be adjusted according to an overall structure, a manufacturing process or other requirements. Therefore, the first reinforcement structure 126e1, the third reinforcement structure 126e3 and the fourth reinforcement structure 126e4 may also extend along the direction perpendicular to the first extending direction E1 of the first shaft portion 130c1 and the thickness direction T, and viewing from the first extending direction E1, the first reinforcement structure 126e1, the third reinforcement structure 126e3 and the fourth reinforcement structure 126e4 are continuous from one end of a part of the first frame portion 120e1 to another end thereof in the direction perpendicular to the first extending direction E1 and perpendicular to the thickness direction T.

Moreover, as shown in FIG. 5B, the first reinforcement structures 126e1 and the fourth reinforcement structures 126e4 extend in a direction perpendicular to the second extending direction E2 of the second shaft portion 130c2 and the thickness direction T, and viewing from the second extending direction E2, the first reinforcement structures 126e1 and the fourth reinforcement structures 126e4 are continuous from one end of a part of the first frame portion 120e1 to another end thereof in the direction perpendicular to the second extending direction E2 and perpendicular to the thickness direction T. On the other hand, viewing from the second extending direction E2 of the second shaft portion 130c2, the first reinforcement structures 126e1 located on the first outer side surface 123e2 of the first main body 122e1 are partially overlapped with the fourth reinforcement structures 126e4.

Moreover, although the third reinforcement structures 126e3 in FIG. 5B are not arranged on the first frame portion 120e1 at the part perpendicular to the second extending direction E2 of the second shaft portion 130c2 and the thickness direction T, in the embodiment, distribution of different types of reinforcement structures may be adjusted according to an overall structure, a manufacturing process or other requirements. Therefore, the first reinforcement structure 126e1, the third reinforcement structure 126e3 and the fourth reinforcement structure 126e4 may also extend along the direction perpendicular to the second extending direction E2 of the second shaft portion 130c2 and the thickness direction T, and viewing from the second extending direction E2, the first reinforcement structure 126e1, the third reinforcement structure 126e3 and the fourth reinforcement structure 126e4 are continuous from one end of a part of the first frame portion 120e1 to another end thereof in the direction perpendicular to the second extending direction E2 and perpendicular to the thickness direction T.

As shown in FIG. 5B, the fifth reinforcement structure 126e5 extends in a direction perpendicular to the second extending direction E2 of the second shaft portion 130c2 and the thickness direction T, and viewing from the second extending direction E2, the fifth reinforcement structure 126e5 is continuous from one end of a part of the second frame portion 120e2 to another end thereof in the direction perpendicular to the second extending direction E2 and perpendicular to the thickness direction T. On the other hand, viewing from the second extending direction E2 of the second shaft portion 130c2, the positioning structures 124e1 located on the second inner side surface 123e3 of the second main body 122e2 are partially overlapped with the fifth reinforcement structure 126e5.

Moreover, as described above, distribution of different types of reinforcement structures may be adjusted according to an overall structure, a manufacturing process or other requirements, so that the embodiment of FIG. 5B may also include the second reinforcement structures 126c2 of FIG. 4C, where the second reinforcement structures 126c2 of FIG. 4C, the positioning structures 124e1 and the fifth reinforcement structure 126e5 of the embodiment may also extend along the direction perpendicular to the second extending direction E2 of the second shaft portion 130c2 and the thickness direction T, and viewing from the second extending direction E2, the second reinforcement structures 126c2 of FIG. 4C, the positioning structures 124e1 and the fifth reinforcement structure 126e5 of the embodiment are continuous from one end of a part of the second frame portion 120e2 to another end thereof in the direction perpendicular to the second extending direction E2 and perpendicular to the thickness direction T.

In brief, the structural strength of the first frame portion 120e1 is enhanced through the first reinforcement structures 126e1 and the third reinforcement structures 126e3 formed by bending the first outer side surface 123e2 and the first inner side surface 123e1 of the first main body 122e1 toward the thickness direction T and the fourth reinforcement structures 126e4 formed by protruding the first main body 122e1 toward the thickness direction T. The structural strength of the second frame portion 120e2 is enhanced through the fifth reinforcement structures 126e5 formed by protruding the second main body 122e2 toward the thickness direction T. The design of the first reinforcement structures 126e1, the third reinforcement structures 126e3, the fourth reinforcement structures 126e4 and the fifth reinforcement structures 126e5 may effectively enhance the structural strength without increasing a width or a material thickness of the frame body 100e, so as to save a space and material. When the optical module (not shown) of the frame body 100e of the embodiment is actuated, compared to the first frame portion 120e1 and the second frame portion 120e2, the first shaft portion 130e1 and the second shaft portion 130e2 will withstand most of a deformation stress, so as to improve the actuation stability and a response speed of the optical module.

In summary, the embodiments of the invention have at least one of following advantages or effects. In the optical module of the invention, a sum of the height of the reinforcement structure and the thickness of the main body of the frame portion is greater than the thickness of the shaft portion. Namely, under the principle that the thickness is proportional to structural strength, a structural strength of the shaft portion of the frame body is smaller than a structural strength of the frame portion. In this way, when the optical module is actuated, the shaft portion will withstand most of a deformation stress relative to the frame portion, so as to improve the actuation stability and a response speed of the optical module. On the other hand, the projection device adopting the optical module may increase an image resolution.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. An optical module, comprising:
    a frame body, comprising:
        at least one fixing portion;
        at least one frame portion, comprising at least one main body, a plurality of positioning structures and at least one reinforcement structure, wherein a part of an inner side surface of the at least one main body is bended toward a thickness direction of the frame body to form the plurality of positioning structures, and the at least one reinforcement structure is connected to the at least one main body and extends in the thickness direction; and
        at least one shaft portion, connected to the at least one fixing portion and the at least one frame portion, and the at least one frame portion being configured to oscillate relative to the at least one fixing portion around the at least one shaft portion, wherein in the thickness direction, a sum of a height of the at least one reinforcement structure and a thickness of the at least one main body is greater than a thickness of the at least one shaft portion, and one of following conditions is satisfied:
            the at least one reinforcement structure and the at least one positioning structure extend in a direction perpendicular to an extending direction of the at least one shaft portion and the thickness direction, and viewing from the extending direction of the at least one shaft portion, the at least one reinforcement structure and the at least one positioning structure are continuous from one end of a part of the at least one frame portion to another end thereof in the direction perpendicular to the extending direction of the at least one shaft portion and perpendicular to the thickness direction; alternatively,
            the at least one reinforcement structure extends in the direction perpendicular to the extending direction of the at least one shaft portion and the thickness direction, and viewing from the extending direction of the at least one shaft portion, the at least one reinforcement structure is continuous from one end of a part of the at least one frame portion to another end thereof in the direction perpendicular to the extending direction of the at least one shaft portion and perpendicular to the thickness direction; and
    an optical element, disposed on the frame body and located in the at least one frame portion, wherein a periphery of the optical element leans against the plurality of positioning structures.

2. The optical module as claimed in claim 1, wherein the at least one shaft portion is connected to an outer side surface of the at least one main body, a part of the outer side surface of the at least one main body is bended toward the thickness direction to form the at least one reinforcement structure, and the at least one reinforcement structure is a plurality of reinforcement structures separated from each other.

3. The optical module as claimed in claim 1, wherein the at least one main body is protruded toward the thickness direction to form the at least one reinforcement structure.

4. The optical module as claimed in claim 1, wherein in the thickness direction, the height of the at least one reinforcement structure is 1 time or more of the thickness of the at least one main body.

5. The optical module as claimed in claim 1, wherein the at least one fixing portion, the at least one frame portion and the at least one shaft portion are formed integrally.

6. The optical module as claimed in claim 1, wherein the at least one frame portion comprises a first frame portion and a second frame portion, the at least one shaft portion comprises at least one first shaft portion and at least one second shaft portion, wherein the first frame portion is connected to the at least one fixing portion through the at least one first shaft portion, and the second frame portion is connected to the first frame portion through the at least one second shaft portion, the optical element is located in the second frame portion, and a first extending direction of the at least one first shaft portion is different to a second extending direction of the at least one second shaft portion.

7. The optical module as claimed in claim 6, wherein the at least one reinforcement structure comprises at least one first reinforcement structure and at least one second reinforcement structure, the at least one main body comprises a first main body and a second main body, the first frame portion comprises the first main body and the at least one first reinforcement structure, and the second frame portion comprises the second main body, the plurality of positioning structures and the at least one second reinforcement structure.

8. The optical module as claimed in claim 7, wherein the first main body has a first outer side surface and a first inner side surface opposite to each other, and the second main body has a second outer side surface and a second inner side surface opposite to each other, the first shaft portion is connected to the first outer side surface of the first main body and the at least one fixing portion, and the second shaft portion is connected to the first inner side surface of the first main body and the second outer side surface of the second main body.

9. The optical module as claimed in claim 8, wherein the first main body is protruded toward the thickness direction to form the at least one first reinforcement structure, and the second main body is protruded toward the thickness direction to form the at least one second reinforcement structure.

10. The optical module as claimed in claim 8, wherein the at least one reinforcement structure further comprises at least one third reinforcement structure, a part of the first outer side surface and a part of the first inner side surface of the first main body are bended toward the thickness direction to respectively form the at least one first reinforcement structure and the at least one third reinforcement structure, a part of the second outer side surface and a part of the second inner side surface of the second main body are bended toward the thickness direction to respectively form the at least one second reinforcement structure and the plurality of positioning structures, the at least one first reinforcement structure is a plurality of first reinforcement structures separated from each other, the at least one second reinforcement structure is a plurality of second reinforcement structures separated from each other, and the at least one third reinforcement structure is a plurality of third reinforcement structures separated from each other, wherein:

the plurality of first reinforcement structures and the plurality of third reinforcement structures extend in a direction perpendicular to the first extending direction of the at least one first shaft portion and the thickness direction, and viewing from the first extending direction, the plurality of first reinforcement structures and the plurality of third reinforcement structures are continuous from one end of a part of the first frame portion to another end thereof in the direction perpendicular to the first extending direction and perpendicular to the thickness direction;

the plurality of first reinforcement structures and the plurality of third reinforcement structures extend in a direction perpendicular to the second extending direction of the at least one second shaft portion and the thickness direction, and viewing from the second extending direction, the plurality of first reinforcement structures and the plurality of third reinforcement structures are continuous from one end of another part of the first frame portion to another end thereof in the direction perpendicular to the second extending direction and perpendicular to the thickness direction; and the plurality of second reinforcement structures and the plurality of positioning structures extend in a direction perpendicular to the second extending direction of the at least one second shaft portion and the thickness direction, and viewing from the second extending direction, the plurality of second reinforcement structures and the plurality of positioning structures are continuous from one end of a part of the second frame portion to another end thereof in the direction perpendicular to the second extending direction and perpendicular to the thickness direction.

11. The optical module as claimed in claim 8, wherein the at least one reinforcement structure further comprises at least one third reinforcement structure, at least one fourth reinforcement structure and at least one fifth reinforcement structure, and a part of the first outer side surface and a part of the first inner side surface of the first main body are bended toward the thickness direction to respectively form the at least one first reinforcement structure and the at least one third reinforcement structure, the first main body is protruded toward the thickness direction to form the at least one fourth reinforcement structure, the at least one first reinforcement structure is a plurality of first reinforcement structures separated from each other, the at least one third reinforcement structure is a plurality of third reinforcement structures separated from each other, and the at least one fourth reinforcement structure is a plurality of fourth reinforcement structures separated from each other, a part of the second outer side surface and a part of the second inner side surface of the second main body are bended toward the thickness direction to respectively form the at least one second reinforcement structure and the plurality of positioning structures, the second main body is protruded toward the thickness direction to form the at least one fifth reinforcement structure, the at least one second reinforcement structure is a plurality of second reinforcement structures separated from each other, and the at least one fifth reinforcement structure is a plurality of fifth reinforcement structures separated from each other, wherein:

the plurality of first reinforcement structures, the plurality of third reinforcement structures and the plurality of fourth reinforcement structures extend in a direction perpendicular to the first extending direction of the at least one first shaft portion and the thickness direction, and viewing from the first extending direction, the plurality of first reinforcement structures, the plurality of third reinforcement structures and the plurality of fourth reinforcement structures are continuous from one end of a part of the first frame portion to another end thereof in the direction perpendicular to the first extending direction and perpendicular to the thickness direction;

the plurality of first reinforcement structures, the plurality of third reinforcement structures and the plurality of fourth reinforcement structures extend in a direction perpendicular to the second extending direction of the at least one second shaft portion and the thickness direction, and viewing from the second extending direction, the plurality of first reinforcement structures, the plurality of third reinforcement structures and the plurality of fourth reinforcement structures are continuous from one end of another part of the first frame portion to another end thereof in the direction perpendicular to the second extending direction and perpendicular to the thickness direction; and the plurality of second reinforcement structures, the plurality of positioning structures and the fifth reinforcement structures extend in a direction perpendicular to the second extending direction of the at least one second shaft portion and the thickness direction, and viewing from the second extending direction, the plurality of second reinforcement structures, the plurality of positioning structures and the plurality of fifth reinforcement structures are continuous from one end of a part of the second frame portion to another end thereof in the direction perpendicular to the second extending direction and perpendicular to the thickness direction.

12. The optical module as claimed in claim 1, further comprising:
a base body, surrounding the frame body, and the at least one fixing portion being fixed on the base body.

13. The optical module as claimed in claim 12, further comprising:
at least one driving assembly, disposed on the base body and the at least one frame portion of the frame body, wherein the at least one frame portion oscillates relative to the base body by a magnetic force generated by the at least one driving assembly.

14. The optical module as claimed in claim 13, wherein the at least one driving assembly comprises at least one coil and at least one magnet.

15. The optical module as claimed in claim 1, wherein a material of the frame body is metal.

16. A projection device, comprising:
an illumination system, configured to provide an illumination beam;
a light valve, configured to convert the illumination beam into an image beam;
a projection lens, configured to project the image beam out of the projection device; and
an optical module, disposed between the light valve and the projection lens, and comprising:
a frame body, comprising:
at least one fixing portion;
at least one frame portion, comprising at least one main body, a plurality of positioning structures and at least one reinforcement structure, wherein a part of an inner side surface of the at least one main body is bended toward a thickness direction of the frame body to form the positioning structures, and the at least one reinforcement structure is connected to the at least one main body and extends in the thickness direction; and
at least one shaft portion, connected to the at least one fixing portion and the at least one frame portion, and the at least one frame portion being configured to oscillate relative to the at least one fixing portion around the at least one shaft portion, wherein in the thickness direction, a sum of a height of the at least one reinforcement structure and a thickness of the at least one main body is greater than a thickness of the at least one shaft portion, and one of following conditions is satisfied:

the at least one reinforcement structure and the at least one positioning structure extend in a direction perpendicular to an extending direction of the at least one shaft portion and the thickness direction, and viewing from the extending direction of the at least one shaft portion, the at least one reinforcement structure and the at least one positioning structure are continuous from one end of a part of the at least one frame portion to another end thereof in the direction perpendicular to the extending direction of the at least one shaft portion and perpendicular to the thickness direction; alternatively, the at least one reinforcement structure extends in the direction perpendicular to the extending direction of the at least one shaft portion and the thickness direction, and viewing from the extending direction of the at least one shaft portion, the at least one reinforcement structure is continuous from one end of a part of the at least one frame portion to another end thereof in the direction perpendicular to the extending direction of the at least one shaft portion and perpendicular to the thickness direction; and an optical element, disposed on the frame body and located in the at least one frame portion, and located on a transmission path of the image beam, wherein a periphery of the optical element leans against the plurality of positioning structures.

17. The projection device as claimed in claim 16, wherein the at least one shaft portion is connected to an outer side surface of the at least one main body, a part of the outer side surface of the at least one main body is bended toward the thickness direction to form the at least one reinforcement structure, and the at least one reinforcement structure is a plurality of reinforcement structures separated from each other.

18. The projection device as claimed in claim 16, wherein the at least one main body is protruded toward the thickness direction to form the at least one reinforcement structure.

19. The projection device as claimed in claim 16, wherein in the thickness direction, the height of the at least one reinforcement structure is 1 time or more of the thickness of the at least one main body.

20. The projection device as claimed in claim 16, wherein a material of the frame body is metal.

* * * * *